July 13, 1965

D. M. PHELPS 3,194,194

SPRAY APPLYING AND SOIL MIXING APPARATUS

Filed Jan. 20, 1964

INVENTOR.
DAVID M. PHELPS
BY
ATTORNEY.

July 13, 1965  D. M. PHELPS  3,194,194
SPRAY APPLYING AND SOIL MIXING APPARATUS
Filed Jan. 20, 1964  3 Sheets-Sheet 2

July 13, 1965

D. M. PHELPS 3,194,194

SPRAY APPLYING AND SOIL MIXING APPARATUS

Filed Jan. 20, 1964

3,194,194
SPRAY APPLYING AND SOIL MIXING
APPARATUS
David M. Phelps, Little Rock, Ark., assignor to Adkins-Phelps Company, North Little Rock, Ark., a corporation of Arkansas
Filed Jan. 20, 1964, Ser. No. 338,930
7 Claims. (Cl. 111—6)

This invention relates generally to agriculture, and particularly to the application of pesticides for the control of weeds, fungi, insects, and soil-borne diseases.

In the application of pesticides to soil, it has heretofore been the practice either to spray a liquid solution, or dust a dry powder, pesticide upon the surface of the soil, and thereafter till the soil so as to inter the pesticide, or to apply the pesticide in the bottom of a furrow while the soil is lifted by a blade and before the lifted soil falls back into place. These methods of application have serious disadvantages now to be related.

One of the most popular pre-emerge herbicides used on cotton crops is a product known as Karmex, manufactured by the Du Pont Company, which is 3-(3,4-dichlorophenyl)-1,1-dimethyl urea, usually abbreviated as Diuron. This product is available commercially both in liquid and in dry form. Whether the dry or liquid product is employed, it is usually applied in a water suspension as a spray to the surface of the soil. The effectiveness of Diuron as a pre-emerge or post-emerge herbicide depends upon the period which elapses between the application and the next following rain. If, after such application, a period of about ten days elapses before rain or other thorough wetting, the effectiveness of Diuron is reduced practically to zero. If as much as a day or two elapses between the application of Diuron to the surface of the soil and the next following rain or other wetting, the effectiveness of Diuron is substantially reduced.

I have discovered that if Diuron be immediately interred after application to the surface of the soil, its effectiveness and longevity is substantially increased over that obtainable when surface application is followed by immediate rain.

Numerous other pre-emerge and post-emerge herbicides, while not dependent upon rainfall, lose their effectiveness when merely applied to the surface of the soil. For example, I have discovered that a herbicide made by Stauffer Chemical Company under the designation of R 1607 6E (whose active ingredient is S-N-propyl-N,N-di-n-propylthiocarbamate) has its effectiveness reduced to 80% unless it is interred within fifteen minutes after being applied to the surface; its effectiveness is reduced to 50% if as much as an hour elapses between application to the surface and interring in the soil; and if it is allowed to lie on the surface of the soil overnight, its effectiveness is reduced practically to zero.

Various other pesticides suffer the same degeneration of effectiveness unless interred promptly after application to the surface.

One method which has heretofore been employed for interring pesticides involves the use of a so-called "Stoneville herbicide blade," which is a sort of plow which lifts a layer of soil and, while lifted, deposits the pesticide on the bottom of the furrow, and then permits the lifted soil to settle back on top of the pesticide. Such a method of application preserves the effectiveness of the pesticide, but has the disadvantage that the pesticide is concentrated at the bottom of the furrow, and consequently limits the activity thereof.

Another method of interring pesticides has involved the use of a so-called "Ferguson tillavator," in the use of which the pesticide is first sprayed upon the surface of the ground, and then the soil agitated by a power-driven blade rotating at high speed. With this operation, it is difficult to control, with the desired precision, the depth at which the pesticide is incorporated into the soil, and much of the soil is scattered behind, and to the side of, the area being operated upon as operation proceeds down the field. Furthermore, such an operation cannot be carried on concurrently with planting.

Still another method of interring pesticides which have been sprayed on the surface of the soil involves the use of a so-called "Liston rolling cultivator." In this apparatus, an axially aligned series of sharp, pointed, tanged wheels are drawn over the surface of the ground and, by contact with the ground, are caused to rotate about a substantially horizontal axis. Such an apparatus is subject to the same disadvantages as those related above in connection with the Ferguson tillavator. However, as between the two, control of the depth of soil agitation at shallow depths, i.e., less than three inches, is almost impossible to achieve with the Liston rolling cultivator.

In the interest of efficient farming, it is desirable to perform as many operations as possible with one movement of a tractor. As indicated previously, it is impossible with the Ferguson tillavator or with the Liston rolling cultivator to inter the pesticide and simultaneously, with the same tractor, accomplish the planting of the desirable seed. However, such can be accomplished by the use of the Stoneville herbicide blade on the front of a tractor, with a planter hitched behind.

In view of these considerations, it is the general object of the present invention to provide a method of uniformly incorporating pesticide in the top layers of soil to a predetermined depth, and with substantially uniform distribution, in an operation which can be followed immediately by the planting of the seed with the same tractor movement; or, alternatively, to accomplish the planting operation at the front of the tractor, and the pesticide application and incorporating at the rear, without disturbing the deposited crop seed.

Another object of the invention is to provide an apparatus which concurrently deposits pesticide on the surface of the soil, presses some of it to a predetermined depth, and substantially incorporates the balance in a soil layer of predetermined depth, without casting the disturbed soil aside and behind the operation to any practical extent.

Other objects will become apparent as the following description is read.

In accordance with the present invention, generally stated, a pesticide, or a mixture of pesticides, such a mixture consisting of herbicide and fungicide, with or without insecticide and/or fumigant, is sprayed upon the surface of the soil and immediately tamped and agitated into the top layers of the soil for a predetermined depth, which may be from a half inch to three inches. This is accomplished by the use of the apparatus later to be described in detail, but which consists essentially of a plurality of gangs of toothed wheels arranged one gang behind the other, and driven in rotation by ground engagement of the wheels while under forward draft. The invention is characterized by the feature that the respective gangs of toothed wheels rotate at different rotational speeds, and preferably that the forward gang rotate at a speed approximately twice that of the rearward gang. Indeed, the wheels in the leading and trailing gangs can be operated at the same rotational speed, provided the wheels in one gang are of greater diameter than the wheels in the other gang, so that the peripheral speeds of the extremities of the teeth are greater on the leading gang than on the trailing gang, and greater than the velocity of the forward motion of the apparatus.

An important feature of the invention is the configuration of the tips of the teeth on the soil-agitating wheels. To accomplish the best result, the tips of the teeth are blunt, thereby providing a tamping action which presses the layer of pesticide deposited upon the soil into a predetermined depth in the soil as the ends of the successive teeth are pressed into the soil. Thus the increments of pesticide between the blunt ends of the teeth and the surface of the soil are mechanically injected beneath the surface of the soil, while the adjacent increments of soil and of pesticide are being agitated and distributed above the level of that pesticide which was tamped into position of the blunt ends of the teeth.

More specifically, the invention contemplates the incorporation of pesticides in the top increments of a soil bed by means of an apparatus which rides upon the surface of the soil bed without substantially sinking into it, while the succession of rotating tangs above mentioned press into, and agitate, the soil while the apparatus is being moved forwardly. The apparatus also includes a spray-head for depositing pesticide upon the surface of the soil immediately ahead of the rotating tangs. The penetration of the tangs into the soil is a result of the weight of the apparatus and its adjunct parts, which is sufficient to force the several tangs to such depth in the soil that the surface-riding members aforesaid make contact with the surface of the soil. Consequently, the tangs, in normal rotation, have their outer increments at sufficient radial displacement from their axes that they extend beneath the surface-riding members, and the depth of penetration may be regulated by adjusting the surface-riding members relative to the axes of the rotating tangs. Obviously, if the soil being operated upon is of such character that the tangs do not penetrate to the depth necessary to bring the surface-riding members into contact with the soil surface, additional weight can be loaded upon the carriage. A characteristic feature of the apparatus is the arrangement of the wheels in the front and rear gangs, so that the tangs of the trailing gang overlap (sidewise) the tangs of the leading gang, and vice versa. As the faster moving tangs are preferably in front, their rotation tends to throw the soil upwardly and backwardly as they move out of engagement with the soil bed. The trajectory of such soil particles as are thrown up by the leading agitators is intercepted by the tangs of the trailing agitators, and deflected back downwardly onto the soil path in a location approximating that from which it was thrown. Moreover, in overly moist soil, or soil otherwise having a characteristic to clod, the internesting of the tangs on the front and rear gangs of agitators, with a clearance of on the order of a quarter to a half inch between them as they rotate, accomplishes a self-cleaning action which prevents any substantial deposit of soil from remaining on a given tang for more than about a half a revolution. This self-cleaning action prevents the building up of such deposits on the ends of, or between, the tangs as would tend, in effect, to enlarge the surface area of the tips of the tangs, and thereby prevent penetration to the desired depth. Otherwise, deposits of moist or cloddy soil building up on the ends of, or between, the tangs would tend to lift the ground-riding members out of engagement with the soil, and the object of the invention would thereby be defeated.

An illustrative embodiment of the invention is shown in the accompanying drawings, in which.

Figure 1:
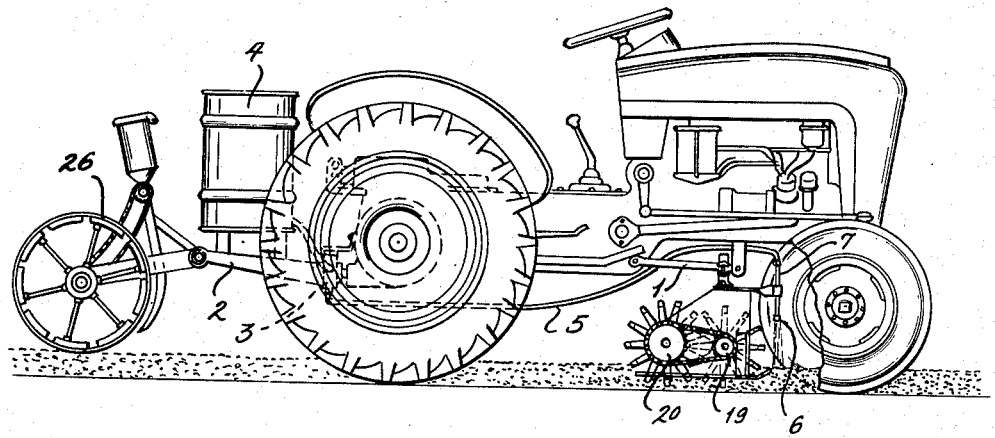
FIGURE 1 is a view in side elevation of a farm tractor equipped with an apparatus for applying and interring pesticides, constructed in accordance with the present invention, and with a seed planter.

In FIGURE 1 of the drawings, there is shown a typical farm tractor having a cultivator frame 1 of conventional type, mounted near the front of the tractor, and a draw bar 2 mounted at the rear. The tractor is equipped with a conventional power take-off which drives a pump 3 for liquid pesticide or an equivalent blower for powdered pesticide. The pump or blower is supplied with pesticide solution or suspension, or powder, from a tank 4, and delivers it through a conduit 5 to the pesticide distributing points on the interring implement to be described in detail. In the form shown, the tank 4 and pump 3 are for liquid applications and mounted at the rear end of the tractor, but it will be understood that they can be mounted in any appropriate position without affecting the function of results of either.

The pesticide distributing and interring implement is hingedly mounted upon the cultivator frame 1 as illustrated in FIGURE 1, so that at least a substantial part of its weight is sustained directly by the soil being worked. The implement consists essentially of an applicator for depositing liquid pesticide substantially uniformly upon the surface of the soil, which applicator is immediately followed by a succession of means for tamping substantial amounts of the applied pesticide to pre-determined depths, and for stirring the balance of the applied pesticide into the soil bed at higher levels. In the preferred form of the implement shown in the drawing, the applicator consists of a nozzle 6, whose orifice is designed to deliver a fan-shaped spray of liquid solution or suspension to the full width of the surface of a pre-prepared seed bed as the tractor proceeds down the row. The nozzle 6 may be of the character shown in U.S. Patent No. 2,683,627, and is connected by means of a pipe 7 with conduit 5 for delivering a stream of pesticide solution or suspension from tank 4.

Pipe 7 is supported by means of a bracket 8 on a structure 9 which forms the housing of the means for tamping, and otherwise incorporating, the surface-applied pesticide into the soil.

The housing 9 comprises vertical side-plates 10 and 11, which are spaced apart a distance corresponding to the width of the soil bed into which the applied pesticide is to be incorporated. The plates 10 and 11 are interconnected at their upper extremities by a channel member 12, which latter forms the base upon which are secured a pair of pedestals 13 of the type usually employed in connecting implements to the cultivator frames of tractors. At the lower side of plates 10 and 11, there is connected to each a skid 14 having a ground-engaging surface of sufficient width and length that the weight of the housing 9, and its adjunct parts, does not depress the skids substantially into the soil of a pre-prepared seed bed. The skids 14 are preferably connected to the respective plates 10 and 11 in a manner such as to provide for convenient adjustment of the elevation of the lower edges of plates 10 and 11 relative to the runner surface of the skids. In the form shown in the drawing, each of the skids is provided with two upstanding angle bars 15, one at the front, and the other at the rear, of the plates 10 and 11; and such angle bars are provided with a plurality of vertically spaced apertures for accommodating an adjusting bolt 16 extending through an aperture appropriately located in the respective plates 10 and 11. Thus to vary the elevation of the lower edges of plates 10 and 11 relative to the runner surfaces of the skids, the bolts 16 are removed from one hole in their cooperating angle bar 15, and replaced in another hole therein which is vertically displaced from the first-mentioned hole. Other appropriate and convenient means for adjusting the elevation of plates 10 and 11 relative to the runner surface of skids 14 may, of course, be utilized.

Near the lower edges of each of plates 10 and 11, there is mounted the bearings for two parallel shafts 17 and 18, which extend in right angular relationship to the length of skids 14. On the outside of one or both of plates 10 and 11, the shafts 17 and 18 are provided with sprockets 19 and 20, respectively, which are connected to the respective shafts in a manner such as to transmit rotary motion from each sprocket to its corresponding shaft. Preferably, the sprockets 19 and 20 are of different pitch diameters, and, in the embodiment shown, the pitch diameter of the leading sprocket 19 is half that of the trailing sprocket 20. The respective sprockets are interconnected by an endless chain 21.

Between the side plates 10 and 11, each of the shafts 17 and 18 is provided with a plurality of tanged wheels 22 which are so affixed to the shafts upon which they are mounted that rotary motion is transmitted therebetween.

In the embodiment shown, the tanged wheels 22 are all identical, three of the same being mounted in axially spaced relationship on the leading shaft 17, and four of the same being mounted in axially spaced relationship on the trailing shaft 18; and the shafts 17 and 18 are spaced apart a distance less than the diameter (across the extremities of the tangs) of the tanged wheels 22. Accordingly, in their assembled relationship, the ascending orbits of the tangs of wheels 22 on shaft 17 overlap the descending orbits of the tangs of the wheels 22 on shaft 18. In order to accommodate such overlapping of the orbits, the wheels 22 are staggered axially on their shafts, so that the tangs of wheels 22 on the trailing shaft move in the spaces between the tangs of adjacent wheels on shaft 17, and vice versa. While, as aforesaid, the several tanged wheels 22 may be, and preferably are, identical, for clarity in disclosure, the tangs of the wheels mounted on the leading shaft 17 are designated 23, while the tangs of the wheels mounted on the trailing shaft 18 are designated 24.

Figure 2:
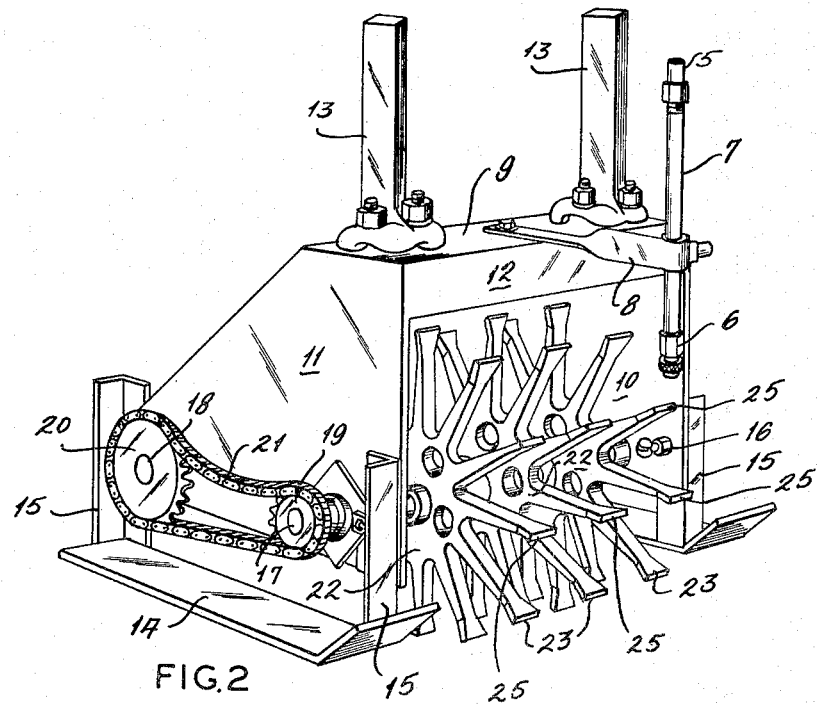
FIGURE 2 is a perspective view of the applying and interring implement.
Figure 4:
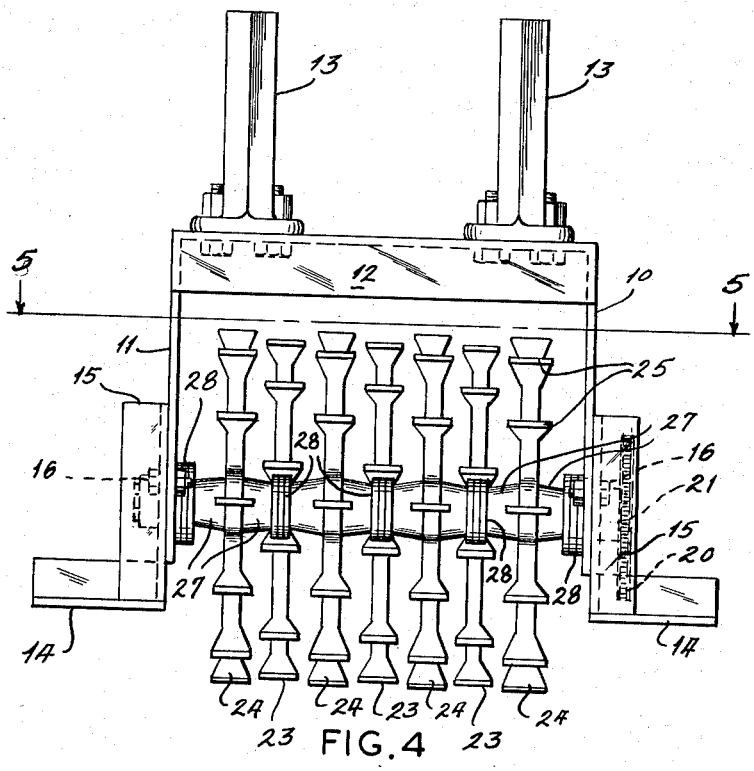
FIGURE 4 is a rear elevation of the implement.

As clearly shown in FIGURES 2 and 4, the several tangs 23 and 24 have blunt ends 25, and are otherwise shaped generally in accordance with the blade of a familiar tamping pick. The blunt ends 25 provide a substantial surface area perpendicular to the radius of the wheels 22, while the portions of the tangs radially inward of the blunt ends 25 of each tang are paddle-shaped.

The construction is such that, when in use, the blunt ends 25 of the tangs 23 each "step on" an increment of pesticide previously deposited by nozzle 6 on the surface of the soil bed; and as movement of the tang continues, the blunt ends penetrate deeper and deeper into the soil bed, thereby pressing the entrapped increments of pesticide to the desired depth until the blunt end of the given tang has passed beneath its shaft and begins its ascent.

A relatively small percentage of the applied pesticide is thus entrapped and pressed to the maximum depth, but, concurrently, the balance of the applied pesticide is stirred into the soil at lesser depths in the manner now to be described.

Figure 3:
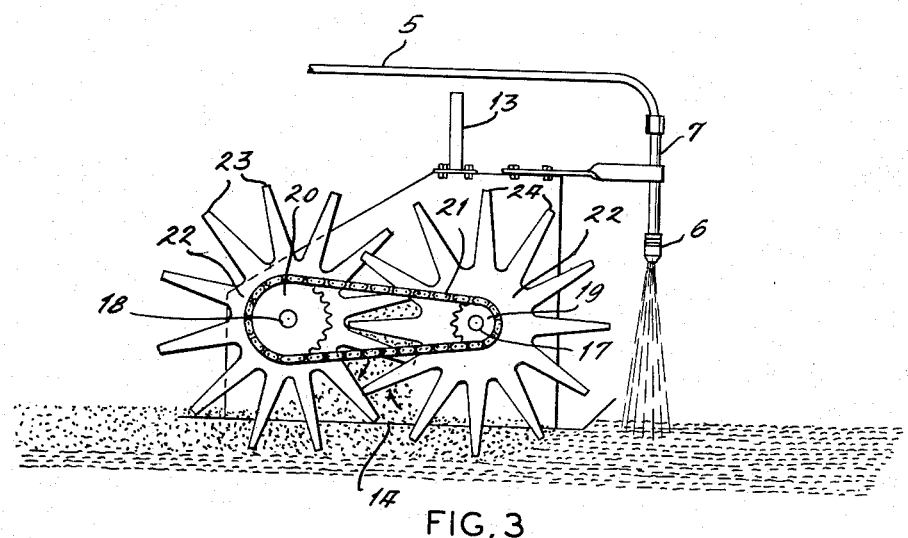
FIGURE 3 is a schematic view illustrating the action of the implement.

In the embodiment shown, rotation of shafts 17 and 18 is induced solely by the soil-embedded tangs' resistance to forward motion of the tractor. That is to say, rotation of shafts 17 and 18 is induced by soil engagement of the tangs, but in view of the difference in pitch diameters between sprockets 19 and 20, tangs 23 make two revolutions to each revolution of tangs 24. Consequently, there is constant sliding of the tangs (at least on the faster rotating shaft) relative to the soil in which they are embedded, and this sliding action wipes the entrapped pesticide off the blunt ends 25 as those blunt ends pass the lower limit of their orbit. The two-to-one ratio between the rotational speeds of tangs 23 and 24, however, cause the linear speed of tangs 23 to exceed the linear speed of the tractor, while the linear speed of tangs 24 lags behind it. Thus, the sliding action of tangs 23 relative to the soil is in the opposite direction from the sliding action of tangs 24 relative to the soil. The excess speed of tangs 23 lifts and stirs the soil during the ascending movement, and casts some of it rearwardly where it is intercepted and rebounded downwardly by the slower moving tangs 24, as shown by the arrows in FIGURE 3. Consequently, the slower moving tangs 24, as they emerge in their ascending movement out of the soil bed, have a dragging action on the surface thereof to smooth it down without throwing it up to any substantial extent. All the while, plates 10 and 11 confine the soil particles lifted and cast by tangs 23, and prevent the pesticide therein from being scattered sidewise of the implement.

The close coupling of the shafts 17 and 18, so that the orbits of tangs 23 overlap the orbits of tangs 24, not only serve to bat down soil particles propelled upwardly by the faster moving tangs 23, but also accomplishes a self-cleaning action on both sets of tangs. If, for example, the soil being worked is overly moist in spots, or otherwise exhibits a tendency to clog, the descending movement of tangs 24 in overlapped relationship to the ascending movement of tangs 23 causes the one to knock off adhered soil from the other.

In the use of the apparatus described, it is frequently desirable, and the present invention makes it possible, to inter and distribute the pesticide in the seed bed at the front end of a tractor having connected to the rear end of it a conventional seed planter 26, so that both operations are simultaneously performed.

Figure 5:
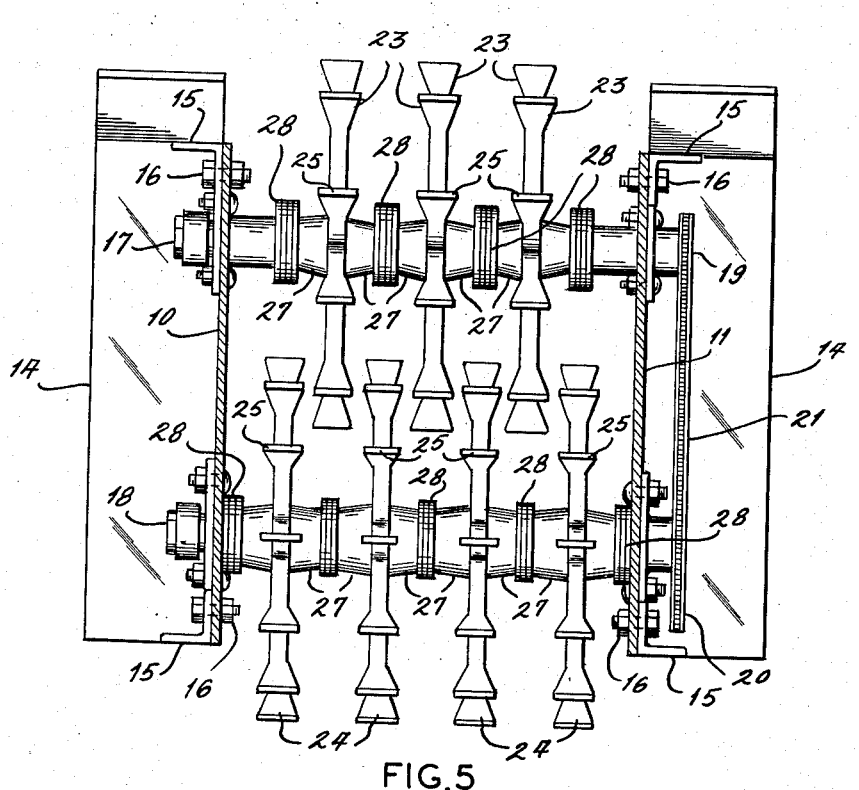
FIGURE 5 is a sectional view along line 5—5 of FIGURE 4.
Figure 6:
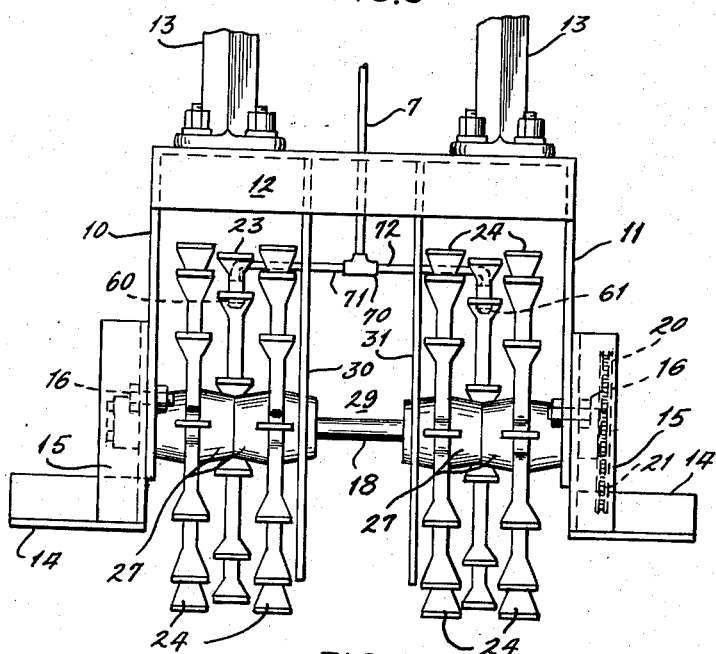
FIGURE 6 is a view corresponding to FIGURE 4, but depicting a modification of the apparatus shown in FIGURES 2, 3, 4 and 5.

From FIGURES 2, 4 and 5, it is apparent that the axial displacement of the several wheels 22 on their respective shafts is greater than need be to accommodate the passage of the paddle ends of tangs 24 between the paddle ends of tangs 23 on either side thereof where their orbits overlap. This is attributable not only to the axial length of hubs 27 on each of tanged wheels 22, but to the interposition between adjacent hubs on each shaft, as well as between the endmost hub and the adjacent plate 10 or 11, of a plurality of washers 28. This feature of the apparatus shown adapts it for modification so as to make it usable after the crop plants have emerged. Such modification is shown in FIGURE 6, where it will be observed that the washers 28 have been removed from the shaft 18, so that the ends of hubs 27 on that shaft now directly abut each other and the adjacent plates 10 or 11, with the exception, however, that at the center of the shaft, a space 29 is provided where there are no tanged wheels on either shaft 17 or 18. To accomplish this, the center one of the wheels 22 on the forward shaft 17 is removed, and the washers 28 removed from trailing shaft 18 are placed on shaft 17 to reposition the tanged wheels thereon outwardly of the position shown in FIGURE 4, or, in other words, so as to place their plane of rotation between the planes of rotation of repositioned tangs 24 on the trailing shaft. A pair of baffle plates 30 and 31, provided with holes to accommodate rotaation of shaft 17 and with larger holes to accommodate hubs 27 of the centermost ones of wheels 22 on the trailing shaft 18, are inserted so as to define, between them, the passage 29 of size sufficient to accommodate the crop plants at an immature stage of growth. The baffle plates 30 and 31 need not necessarily extend rearwardly any further behind shaft 18 than is necessary to mount it upon the hubs of wheels 22 on that shaft, but such plates extend forwardly of leading shaft 17 for a distance sufficient to overlap the foremost spread of the pesticide spray; and instead of providing a single nozzle on pipe 7, a T 70 is substituted with branches 71 and 72 leading to a pair of nozzles 60 and 61, each located outwardly of baffle plates 30 and 31. With the baffle plates 30 and 31 extending as thus described, and the nozzles 60 and 61 disposed outwardly thereof, the implement may be drawn down the row to apply post-emerge herbicide onto the middles and inter it as previously described, without disturbing the crop plants or their root systems, or damaging them by the pesticide applied.

From the foregoing description, it should be apparent to those skilled in the art that the invention accomplishes its objects and provides an apparatus which, when mounted on the front end, or intermediate the front and rear wheels, of a tractor, first deposits a spray of pesticide on the surface of the soil, then immediately tamps some of it to a predetermined depth, while the adjacent soil, with the balance of the surface-deposited pesticide, is stirred into the top increments of the soil to the depth of, but not below, the depth of penetration of the tangs. If increments of the surface of the soil upon which the pesticide has been deposited are not actually disturbed in this operation, they are nonetheless covered by soil moved from adjacent locations, so that all of the pesticide deposited on the surface is, in the course of the operation, interred. In normal operation of the apparatus on soil bed which has been previously prepared, the peripheral speed of the tips of the tangs 23 on the leading gangs of agitators is somewhat greater than the speed of forward movement of the tractor, while the peripheral speed of the tips of the tangs 24 on the trailing gang is somewhat less than the speed of forward movement of the tractor. In the embodiment shown, the rotational speed of the forward gang of agitators is twice that of the rotational speed of the trailing gang of agitators, but it will be understood that this relationship depends entirely upon the gear reduction between the shafts carrying the respective gangs of agitators, and can be modified appropriately to accommodate for local soil conditions. The peripheral speeds of the respective tang ends relative to the forward speed of the tractor depends upon soil conditions. For example, in tight soil, the peripheral speed of the tips 23 of the leading gang of agitators may be approximately that of the forward speed of the tractor, and in that event, the peripheral speed of the tips 24 of the trailing gang of agitators, in the embodiment illustrated, is only about half the forward speed of the tractor. However, in loose soil, where slippage between the portions of the agitator tangs, which are embedded in the soil bed, is relatively easy, the peripheral speed of the tangs 23 in the leading gang will usually exceed the speed of forward motion of the tractor, and it is in this instance that some tendency to cast soil upwardly and rearwardly is encountered which, as hereinbefore mentioned, is intercepted by the tangs 24 of the trailing gang and batted down substantially in the same position from which it emerged.

In a normal operation of the apparatus disclosed in FIGURES 1 through 5, as in the application of pre-emerge herbicide to a cotton crop, the ground-engaging members are adjusted relative to the carriage, so as to permit the tips of the tangs on the agitators to penetrate the soil bed to a depth of one inch, and so that, with a seed planter hitched to the rear end of the same tractor, the seed may be deposited in the soil bed to a depth of an inch and a quarter, all with the same movement of the tractor. Consequently, the seed is planted beneath the layer of soil into which the pesticide has been incorporated, and the root of the desired plant, such as cotton, is unimpaired by the presence of the pesticide in the layers of soil above the seed, but such grass and noxious weed seed as may be in the soil layer into which the pesticide has been incorporated are affected by the pesticide at, or shortly after, germination. Even weed seed and noxious grass seed, which may germinate below the soil layers into which the pesticide has been incorporated, may, depending upon their sensitivity to the particular herbicide employed, be killed before they emerge from the surface, but other seeds, including that of the cotton or other desirable plant which are tolerant to the pesticide incorporated, emerge unimpaired.

The apparatus of the present invention is similarly employed after the desired plant has emerged. For example, at "lay-by" time, herbicide is frequently applied to the middles, i.e., between the rows of crop plants so as to kill the weeds and grasses which would otherwise rob the soil of moisture and nutrients. In the latter case, the apparatus of the present invention is drawn across the field between rows of crop plants to apply herbicide having toxicity to weeds and grasses either by contact with the foliage or by affecting their root system.

With the modification of the apparatus shown in FIGURE 6, a herbicide may be applied to the soil after the crop plants have emerged, and without adversely affecting the crop plants, even though they are sensitive to the herbicide. In this instance, the apparatus of the invention is drawn across the field astride the row of crop plants, that is to say, with the crop plants between baffles 30 and 31, so that the baffles prevent the spray of herbicide from contacting the foliage of the plant, and deposit the herbicide outside the main root system of the crop plants, but nonetheless in a position such as to affect the weeds and noxious grasses which may be growing there. The baffles not only prevent the spray of herbicide from contacting the foliage of the plant, but prevent the agitators from casting herbicide-laden soil against the foliage.

From the foregoing description, those skilled in the art should readily understand the construction and operation of the invention and realize that it accomplishes its objects. While one complete embodiment of the invention has been disclosed in detail, it is to be distinctly understood that the invention is not limited to the details of the foregoing disclosure, but, on the contrary, such modifications and variations thereof as may suggest themselves to those skilled in the art, without departing from the spirit of the invention, are contemplated by and within the scope of the appended claims.

Having thus described the invention, what is claimed and desired to be secured by Letters Patent is:

1. Apparatus for applying pesticides to and incorporating them in soil comprising, a carriage having a side wall, an applicator on the front of the carriage for spraying pesticide onto the surface of the soil, a plurality of gangs of soil agitators behind said applicator for working the soil to a predetermined depth and incorporating the pesticide therein, each gang comprising a plurality of tangs mounted for rotation on a shaft, the shafts for the respective gangs being substantially parallel, means mechanically interconnecting the shaft of one gang with the shaft of the other gang to cause the leading gang to rotate at greater speed than the trailing gang, said side wall forming a barrier between said means and said agitators, and soil riding skids mounted on said carriage at each side thereof for controlling the depth to which said tangs penetrate the soil.

2. The combination of claim 1 wherein the tangs extend radially from hubs and a plurality of such hubs is mounted in axial succession on each shaft, the mounting of the hubs on the respective shafts being such that the tangs on one shaft rotate in planes which lie between the planes of rotation of tangs on the other shaft.

3. The combination of claim 2 wherein the orbits of the tangs in one gang overlap the orbits of the tangs in another gang.

4. The combination of claim 3 wherein the axes of the respective gangs of soil agitators are adjustable relative to the skids to vary the depth of penetration of the tangs; and the agitators are motivated by traction.

5. The apparatus of claim 1 wherein the tangs are substantially wider, in the axial direction, at their ends remote from the axis of the tanged members than at positions between said ends and said axis.

6. The apparatus of claim 1 wherein said skids are adjustable relative to the axes of the respective gangs of soil agitators to vary the depth of penetration of the tangs.

7. In a device for incorporating surface deposited pesticides and the like within a prepared seed bed to a predetermined maximum depth, the combination which comprises: a carriage; a pesticide spreader at the leading end of said carriage; a pair of parallel seed bed-surface riding skids on said carriage behind said spreader; a plurality of tanged members; means on said carriage mounting said tanged members for rotation relative to said skids while the axes of such rotation are fixed relative to said skids, said tanged members each having a plurality of slender tangs extending radially from the axes thereof for a distance substantially greater than the vertical distance between said skids and said axes, said tanged members being arranged in gangs one behind the other, the axes of said gangs being parallel, substantially horizontal, at right angles to the length of said skids and spaced apart, lengthwise of the skids, a distance greater than the radial length of the tangs but less than twice the radial length of the tangs; means for adjusting the vertical distance between said skids and the axes of said tanged members, the several tangs on each tanged member being straight, of length greater than the circumferential distance between the free ends thereof, and terminating in blunt ends spaced substantially half a radian apart; said tanged members being so mechanically interconnected that the leading tanged members have a rotational speed substantially in excess of the rotational speed of the trailing tanged members.

References Cited by the Examiner

UNITED STATES PATENTS

| | | | |
|---|---|---|---|
| 894,939 | 8/08 | Bruggs | 172—188 X |
| 1,251,945 | 1/18 | Wagner | 111—1 |
| 1,641,393 | 9/27 | Mackie | 172—69 |
| 1,853,718 | 4/32 | Bozeman | 172—556 |
| 1,908,255 | 5/33 | Kaupke. | |
| 2,754,622 | 6/56 | Rohnert | 111—1 |
| 2,881,848 | 4/59 | Liston | 172—555 |
| 2,974,616 | 3/61 | Pawela | 111—11 |

OTHER REFERENCES

Pub.: "Farm Implement and Machinery Review," October 1, 1957, vol. 83, No. 990, page 882.

ABRAHAM G. STONE, *Primary Examiner.*

WILLIAM A. SMITH, III, *Examiner.*